(12) United States Patent
Hatae et al.

(10) Patent No.: US 8,606,118 B2
(45) Date of Patent: Dec. 10, 2013

(54) OPTICAL DIGITAL COHERENT RECEIVER

(75) Inventors: Kazuhiko Hatae, Kawasaki (JP);
Noriyasu Nakayama, Kawasaki (JP);
Nobukazu Koizumi, Kawasaki (JP);
Yuji Obana, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 198 days.

(21) Appl. No.: 13/196,997

(22) Filed: Aug. 3, 2011

(65) Prior Publication Data

US 2012/0128377 A1    May 24, 2012

(30) Foreign Application Priority Data

Nov. 22, 2010  (JP) ................................ 2010-260621

(51) Int. Cl.
*H04B 10/06* (2011.01)
*H03H 7/30* (2006.01)
*H03H 7/40* (2006.01)
*H03K 5/159* (2006.01)

(52) U.S. Cl.
USPC ............ 398/202; 398/208; 398/210; 375/232

(58) Field of Classification Search
USPC ............................ 398/202, 208, 210; 375/232
See application file for complete search history.

(56) References Cited

U.S. PATENT DOCUMENTS

| | | | |
|---|---|---|---|
| 5,955,921 A | | 9/1999 | Ide et al. |
| 6,373,533 B1* | | 4/2002 | Kawabata et al. ............ 348/672 |
| 7,590,174 B2* | | 9/2009 | Wong et al. .................... 375/229 |
| 2003/0204398 A1* | | 10/2003 | Haverinen et al. ............ 704/233 |
| 2004/0071236 A1* | | 4/2004 | Dhalla et al. .................. 375/345 |
| 2010/0291885 A1* | | 11/2010 | Shimizu et al. ............... 455/102 |

FOREIGN PATENT DOCUMENTS

| | | |
|---|---|---|
| JP | 10-173456 | 6/1998 |
| JP | 2000-059309 | 2/2000 |
| JP | 2005-039860 | 2/2005 |
| JP | 2009-206968 | 9/2009 |

OTHER PUBLICATIONS

Dany-Sebastien Ly-Gagnon, et al.; "Coherent Detection of Optical Quadrature Phase-Shift Keying Signals With Carrier Phase Estimation", Journal of Lightwave Technology, vol. 24, No. 1; Jan. 2006, pp. 12-21.

* cited by examiner

*Primary Examiner* — Leslie Pascal
*Assistant Examiner* — Casey Kretzer
(74) *Attorney, Agent, or Firm* — Fujitsu Patent Center

(57) ABSTRACT

An ALC processing unit to adjust the signal level of outputs from an adaptive equalizer to a target value is provided in a stage later than the adaptive equalizer and earlier than a frequency offset estimation/compensation unit in an optical digital coherent receiver. The ALC processing unit generates a histogram that counts the number of samples for discrete monitored values corresponding to amplitude values of outputs from the adaptive equalizer, and determines a level adjustment coefficient that is to be multiplied by an output from the adaptive equalizer so as to multiply the determined coefficient by the output from the adaptive equalizer so that the monitored value of the peak value of the histogram is the target value.

10 Claims, 16 Drawing Sheets

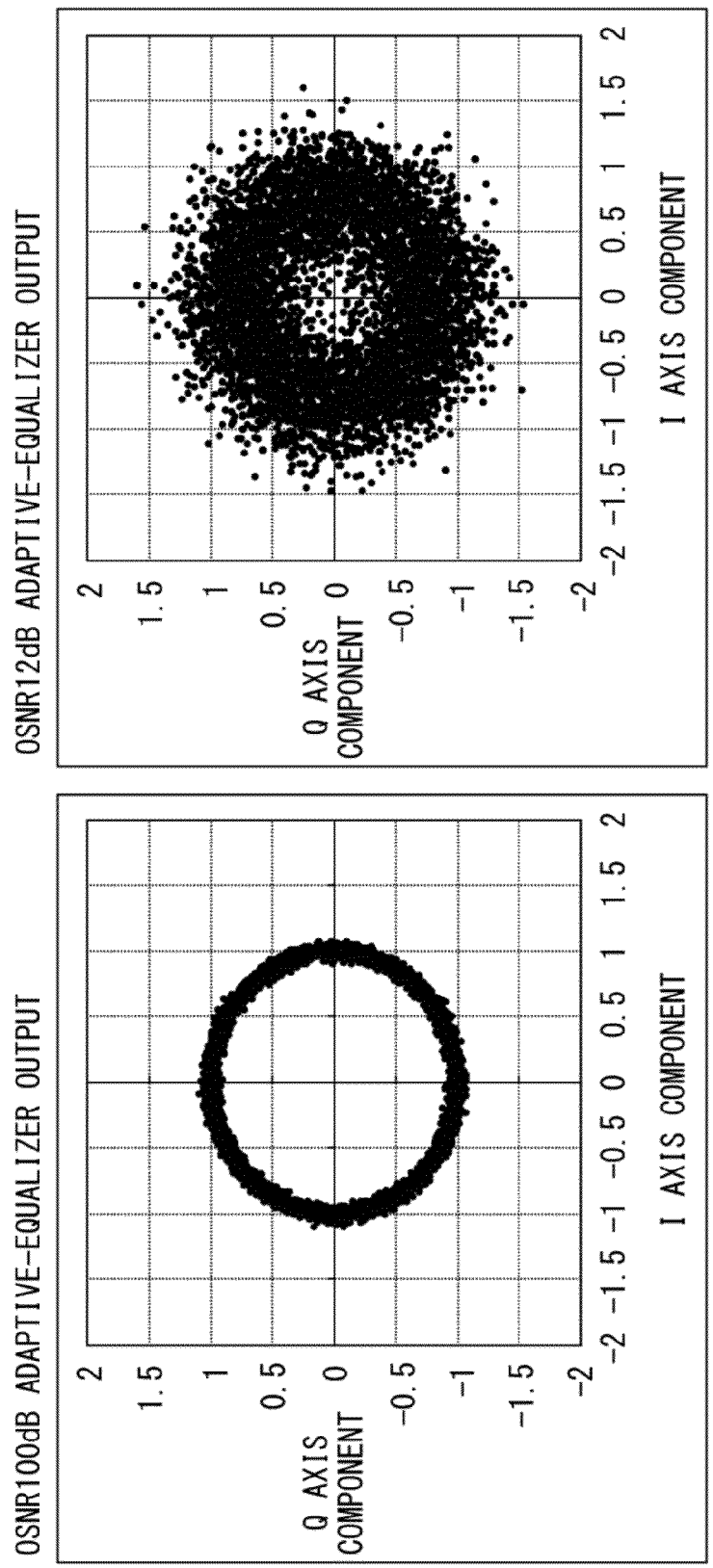

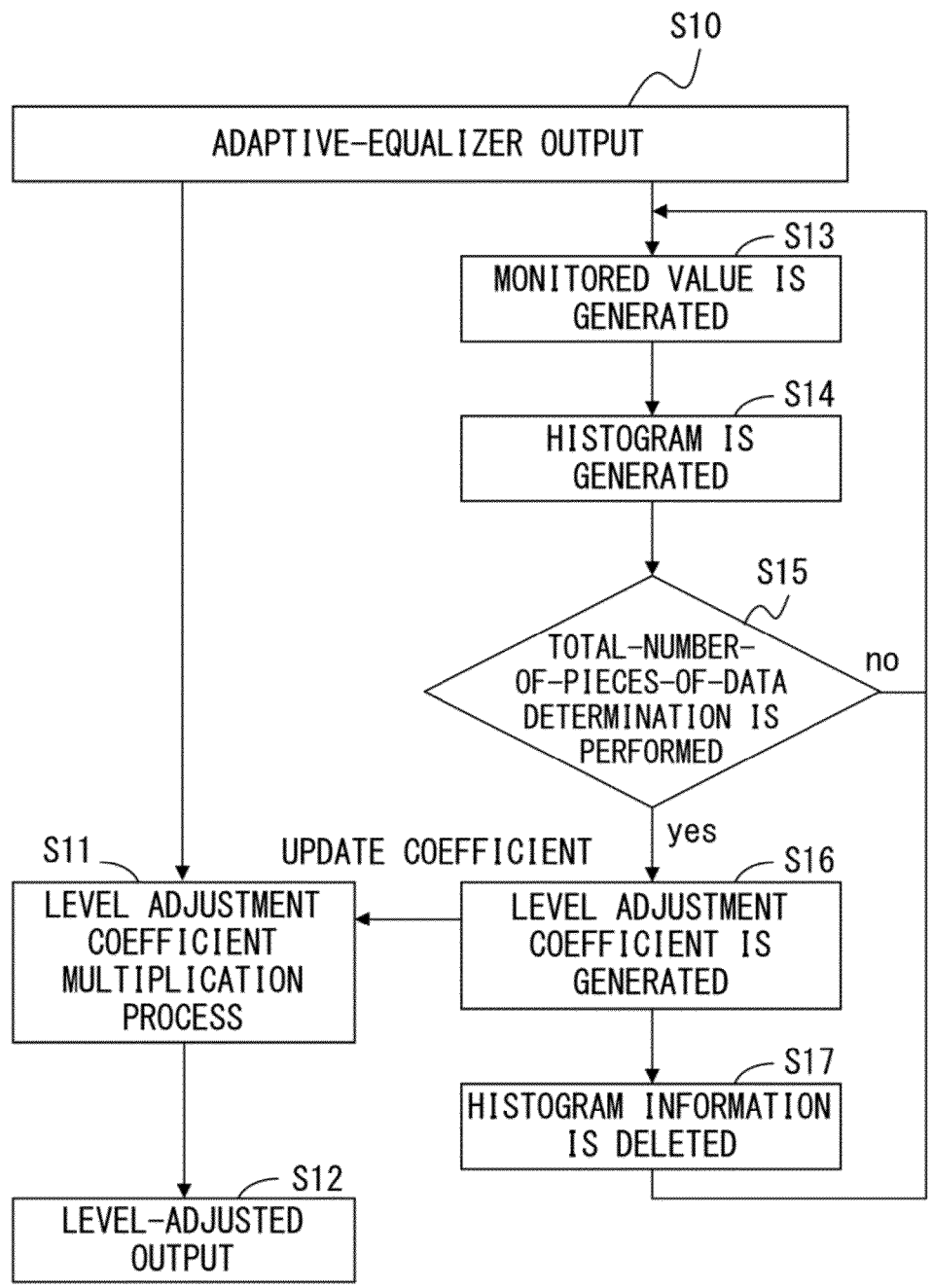
F I G. 9

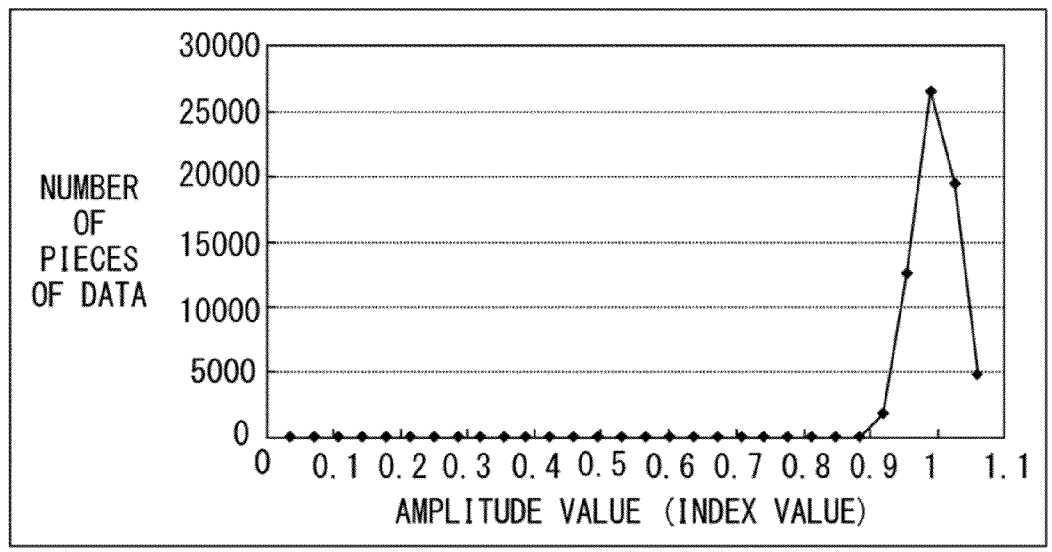
F I G. 1 1 A
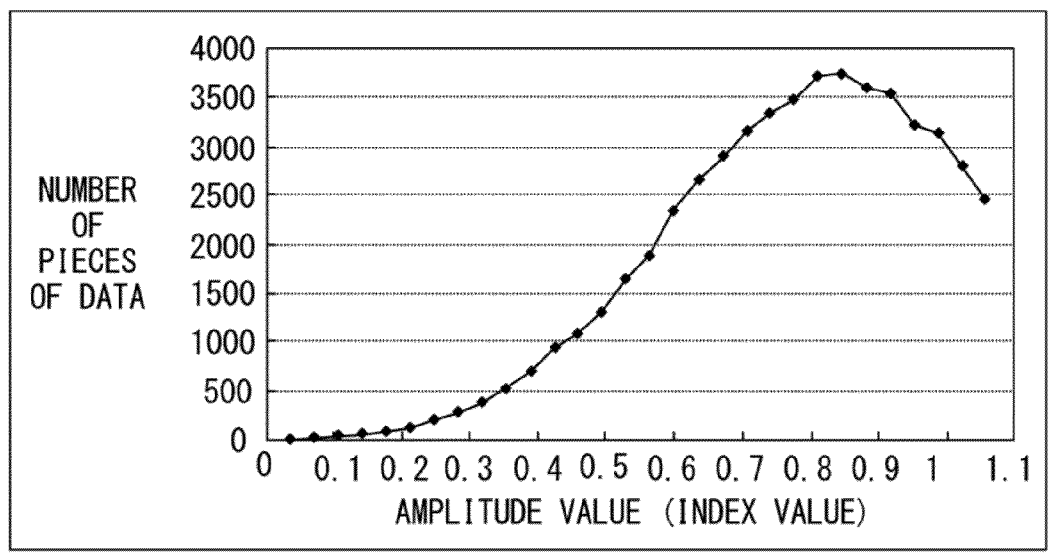
F I G. 1 1 B

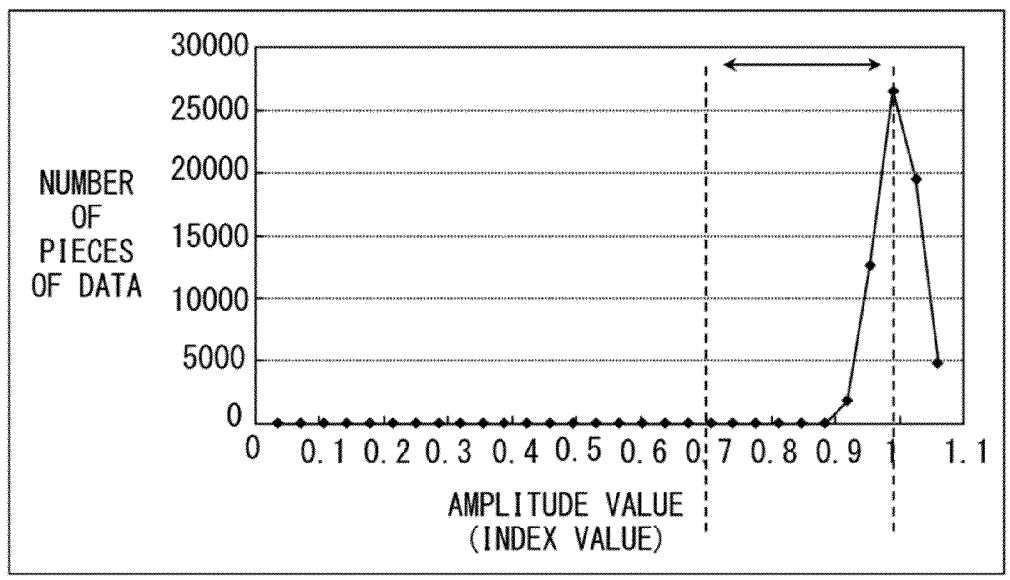
F I G. 1 2 A
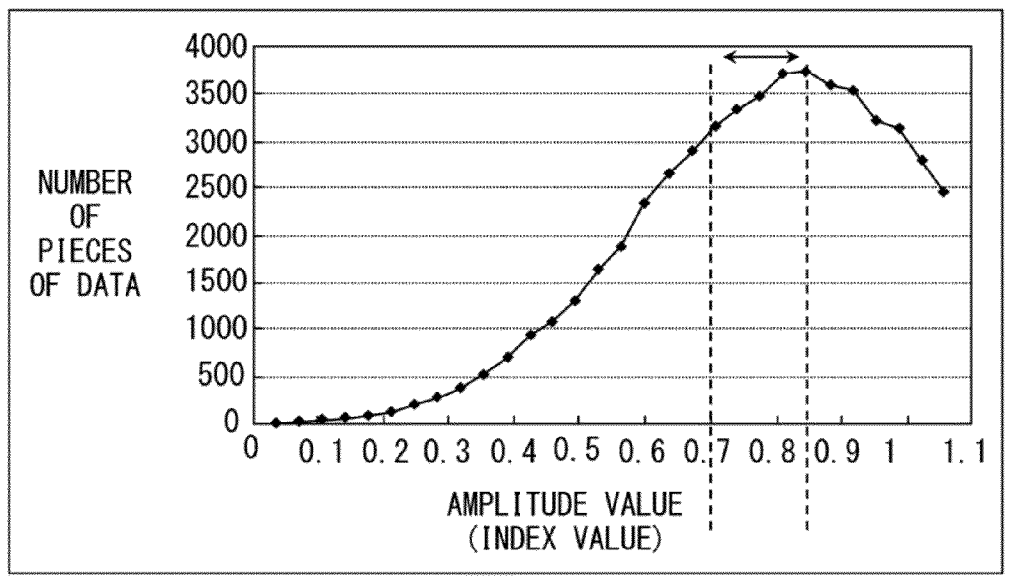
F I G. 1 2 B

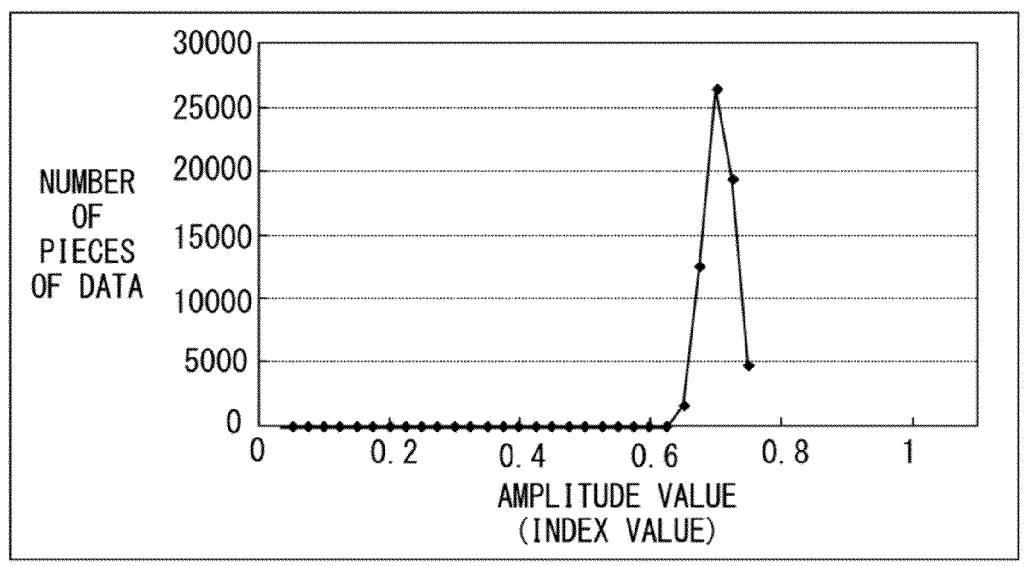
F I G. 13A
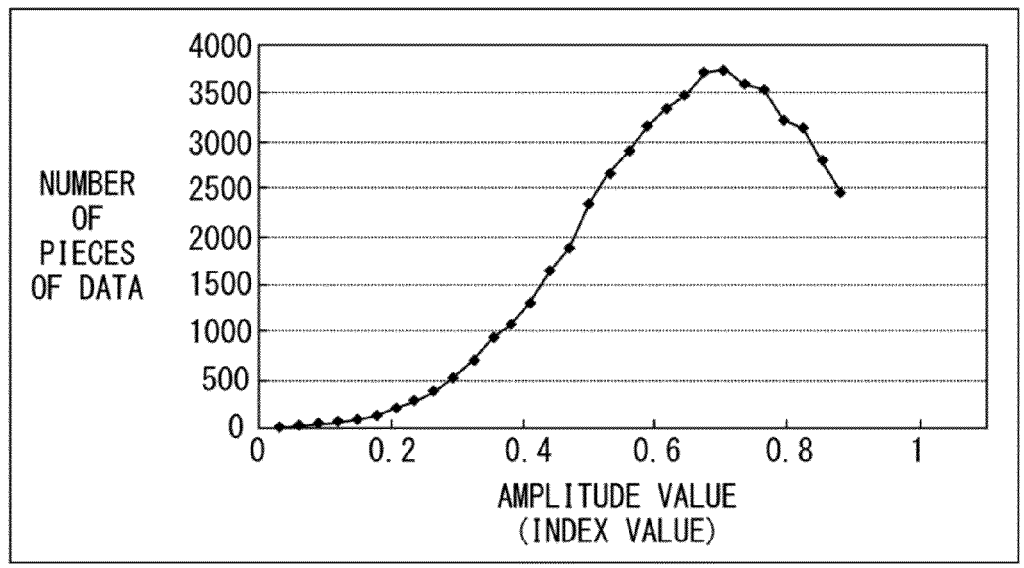
F I G. 13B

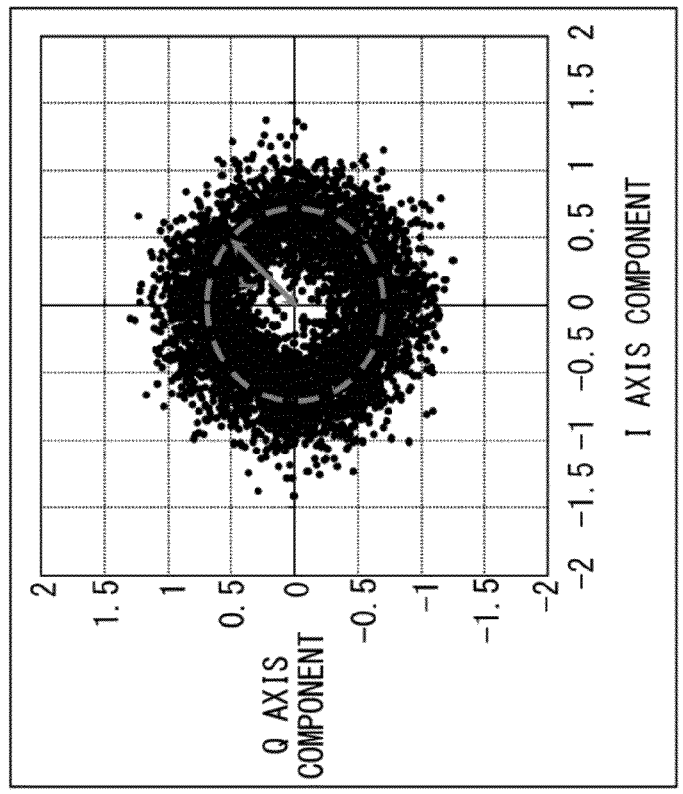
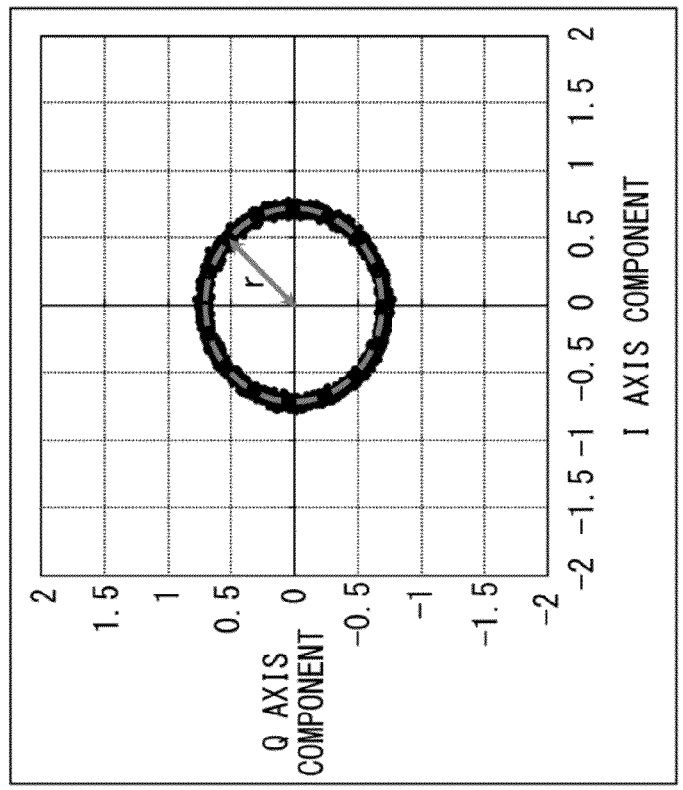

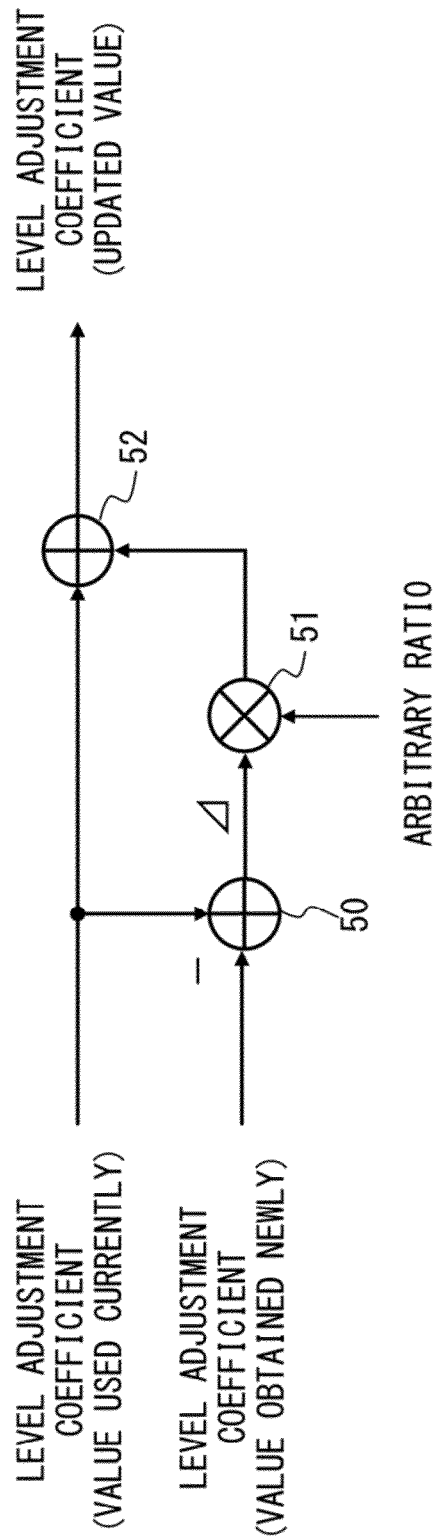
F I G. 15

OPTICAL DIGITAL COHERENT RECEIVER

CROSS-REFERENCE TO RELATED APPLICATIONS

This application is based upon and claims the benefit of priority from prior Japanese Patent Application No. 2010-260621, filed on Nov. 22, 2010, the entire contents of which are incorporated herein by reference.

FIELD

The embodiments discussed herein are related to an optical digital coherent receiver.

BACKGROUND

Communications traffic is expected to increase rapidly due to the spread of new services such as cloud computing, video distribution using the Internet, and the like. In order to cope with the increase in communications traffic, research and development of optical transceivers that can transmit 100 Gbps-order signals are carried out.

However, an increase in bit rate per wavelength leads to a greater deterioration in signal quality due to lowered tolerance with respect to the Optical Signal to Noise Ratio (OSNR), wavelength dispersion in transmission channels, and waveform distortion caused by polarization mode dispersion or by a nonlinear effect. Accordingly, digital coherent receiving methods yielding the OSNR tolerance and the waveform distortion tolerance in transmission channels have been attracting attention in recent years (non-Patent Document 1).

In optical digital coherent receiving methods, a high quality can be attained even at high bit rates because these methods make it possible to perform waveform distortion compensation via the improvement of the OSNR tolerance and digital signal processing circuits, and to perform adaptive equalization in response to temporal variations of the propagation characteristics of the optical transmission channel.

By contrast to a conventional method in which signal intensities are expressed by an ON or OFF assigned to binary signals and waves are detected directly, in an optical digital coherent receiving method, the light intensity and the phase information are extracted using a coherent receiving method, and the extracted intensity and phase information are quantized by using an Analog-Digital Converter (ADC) in order to perform demodulation using a digital signal processing circuit.

DP-QPSK (Dual Polarization-Quadrature Phase Shift Keying), a phase modulation method used for optical digital coherent receiving methods, is capable of assigning two-bit data to four modulated optical phases (0 deg, 90 deg, 180 deg, and 270 deg) for the P polarization and the S polarization, respectively. In DP-QPSK, the symbol rate can be reduced to one-fourth of the information transmission rate, making it possible to reduce the size and cost of the systems.

FIG. 1 illustrates an exemplary configuration of a conventional optical digital coherent receiver.

In an optical digital coherent receiver 10, an ADC 12 performs a quantization process on received optical data, and a received data digital processing unit 11 digitally performs a process after the quantization process.

An imbalanced amplitude correction unit 13 in the received data digital processing unit 11 corrects the imbalance between the I signal amplitude and the Q signal amplitude of the received data containing the I signal and the Q signal that have been digitized by the ADC 12. This correction is performed because a great imbalance between the I signal amplitude and the Q signal amplitude will often cause errors in processes to be executed later. Signals processed by the imbalanced amplitude correction unit 13 are input to a fixed equalizer 14. The fixed equalizer 14 digitally performs dispersion compensation and compensation (equalization) for waveform deformation caused by polarization mode dispersion or by a nonlinear effect, or the like. The fixed equalizer 14 performs a quantization process for a prescribed quantity. Thereby, dispersion caused by characteristics unique to each optical transmission channel is compensated for. Signals output from the fixed equalizer 14 are input to a sampling phase adjusting unit 15. The sampling phase adjusting unit 15 adjusts a timing at which the signal value of a received signal is sampled, and adjusts a sampling timing on the basis of the sampling phase value detected by a sampling phase detection unit 16. When a sampling timing coincide with the transitioning timing of a signal, the sampled value of the signal tends to be erroneous, and thus attention is paid so that the sampling timing does not coincide with the transitioning timing of a signal.

Signals output from the sampling phase adjusting unit are input to an adaptive equalizer 17. The adaptive equalizer 17 compensates for waveform distortion that was caused by aging degradation of transmission channels and that was not completely compensated for by the fixed equalizer 14. The adaptive equalizer 17 includes digital filters and controls the coefficients of tap coefficients so as to compensate for waveform distortion. As a tap coefficient, a value having a weight calculated by an equalization weight calculation unit 18 is set. Signals output from the adaptive equalizer 17 are input to a frequency offset estimation/compensation unit 19. The frequency offset estimation/compensation unit 19 compensates for the difference between the frequency of carrier waves used by the transmission side of the optical transmission system and the frequency of the station-transmitted waves used by the receiving side. When there is a difference between the frequency of carrier waves used by the transmission side and the frequency of the station-transmitted waves of the receiving side, the signal point on the I-Q plane turns on the I-Q plane, and thus such a difference is compensated for.

Output signals from the frequency offset estimation/compensation unit 19 are input to a carrier phase offset estimation/compensation unit 20. The carrier phase offset estimation/compensation unit 20 compensates for an offset of 90 degrees of the signal point on the I-Q plane. In other words, the frequency offset estimation/compensation unit 19 prevents the signal point from turning on the I-Q plane, and thereby the signal point stays at certain positions on the I-Q plane. However, even if the signal point is prevented from turning, there is still a possibility that the phase of the signal point will be at the position after the 90-degree turn of the phase of the signal point. Accordingly, a process is executed to turn 90 degrees backward to the original position a signal point that may be at the position of having been turned 90-degrees. This phase difference of 90 degrees is caused by an offset of phases of carrier waves, and thus, compensation for the phase offset of carrier waves makes it possible to return the signal point back to the original position.

Signals output from the carrier phase offset estimation/compensation unit 20 are input to an error correcting code unit 21. The error correcting code unit 21 performs Viterbi decoding or Turbo decoding, and evaluates which quadrant on the I-Q plane a signal point is likely to exist in by using a likelihood based method in order to correct errors.

Arts related to the present invention have been disclosed as below.

For example, there is an optimum threshold value setting circuit system for a discriminator of an optical receiver that responds to fluctuations of input signal levels, again control system having a wide dynamic range that utilizes a full scale range of an AD converter, an AGC amplifier for an optical receiver that responds to pulse signals, and a circuit system for protecting a photodetector and avoiding amplifier saturation that responds to pulse signals in an optical receiver.

Patent Document 1: Japanese Laid-open Patent Publication No. 2000-59309

Patent Document 2: Japanese Laid-open Patent Publication No. 2009-206968

Patent Document 3: Japanese Laid-open Patent Publication No. 10-173456

Patent Document 4: Japanese Laid-open Patent Publication No. 2005-39860 non-Patent Document 1: D. Ly-Gagnon, IEEE JLT, vol. 24, pp. 12-21, 2006

In the adaptive equalizer (AEQ) of an optical digital coherent receiver, the levels of signal components in adaptive-equalizer output signals vary depending upon the applied algorithm. In an error correcting process executed after an adaptive equalization process, the signal components of input signals are required to be at an optimum level (that is set by the circuit configuration of the error correcting code unit) for the error correcting process. However, a method of adjusting signal components of adaptive-equalizer output signals to an optimum level in an optical digital coherent receiver has not been disclosed.

As a conventional method of detecting a signal level, there is a method in which the average value of the total electric power of adaptive-equalizer output signals is used, and a method in which the average value of the peak electric power is used. In the method in which the average value of the total electric power of adaptive-equalizer output signals is used, if an adaptive-equalizer algorithm that makes the total electric power value of signal components and noise components a certain level is used, the average value of the total electric power of adaptive-equalizer output signals includes noise components, and thus variation in the level of signal components of adaptive-equalizer output signals caused by noise components included in the average value of the total electric power of adaptive-equalizer output signals prevents precise detection or adjustment of the level of signal components.

FIGS. 2A and 2B illustrate examples of adaptive-equalizer outputs having different amounts of noise in adaptive equalizer inputs (i.e., OSNRs).

When an adaptive equalizer algorithm that makes the total electric power of signal components and noise components of adaptive-equalizer output signals a certain level is used, the signal components vary depending upon the noise components. In FIG. 2, when the OSNR is 100 db (noise components: low as in FIG. 2A), the average of the signal components is approximately 1.0, while when the OSNR is 12 db (noise components: high as in FIG. 2B), the average of the signal components is smaller than 1.0, meaning that the levels of the signal components vary depending upon the noise components.

FIGS. 3A and 3B illustrate problems in adaptive-equalizer outputs caused by differences in the amounts of noise in adaptive equalizer inputs.

As illustrated in FIG. 3A, amplitudes of signal points in outputs from the adaptive equalizer when the OSNR is 100 dB are collected around a particular point, and the amplitude value is approximately 1.0. When the OSNR is 12 dB as illustrated in FIG. 3B, many noise components are included in the signal components, and accordingly the signal points spread and the average of the amplitude value of the signal components is approximately 0.85. In other words, when many noise components are included in the signal components of inputs of the adaptive equalizer, the amplitude of the signal components of outputs of the adaptive equalizer is affected, causing differences in the level of signal components between when the OSNR is excellent and the OSNR is poor. In addition, amplitude value r is expressed as $r=\sqrt{(I^2+Q^2)}$ where I represents the amplitude of I signal and Q represents the amplitude of Q signal. In this expression, $I^2+Q^2$ represents the electric power value, and by calculating the root of this value, the amplitude value can be obtained. This relationship between the amplitude value and the electric power value is also applied to the explanations below.

SUMMARY

An optical digital coherent receiver according to an aspect of embodiments described below is an optical digital coherent receiver that performs optical coherent reception and detection of a received optical signal and demodulates the received signal by a digital signal process, and that includes an adaptive equalizer to compensate for waveform distortion of the received signal and to output a resultant signal, and a signal level adjustment unit to repeat operations of sampling an amplitude value of a signal output from the adaptive equalizer so as to determine a monitored value as a discrete value corresponding to the amplitude value, to generate, from a monitored value based on the largest number of samples for which different values are obtained as the monitored values and from a target value from among a plurality of sampling operations, a level adjustment coefficient to be multiplied by the output signal, and to perform a signal level adjustment by multiplying the output signal by the level adjustment coefficient.

In the following embodiments, an optical digital coherent receiver that is capable of performing error correction appropriately even when input signals involve a greater number of noise components is provided.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A illustrates an example of adaptive-equalizer outputs having different amounts of noise in adaptive equalizer inputs (i.e., OSNRs) (part 1);

FIG. 2B illustrates an example of adaptive-equalizer outputs having different amounts of noise in adaptive equalizer inputs (i.e., OSNRs) (part 2);

FIG. 9 is a flowchart illustrating a process performed by the ALC processing unit;

FIG. 11A illustrates an example of a histogram (part 1);

FIG. 11B illustrates an example of a histogram (part 2);

FIG. 12A illustrates operations according to the present embodiment (part 1);

FIG. 12B illustrates operations according to the present embodiment (part 2);

FIG. 13A illustrates operations according to the present embodiment (part 3);

FIG. 13B illustrates operations according to the present embodiment (part 4);

FIG. 14A illustrates results obtained by applying the present embodiment to signals illustrated in FIG. 2 (part 1);

FIG. 14B illustrates results obtained by applying the present embodiment to signals illustrated in FIG. 2 (part 2);

FIG. 15 illustrates another example of a method of generating a level adjustment coefficient.

DESCRIPTION OF EMBODIMENTS

Figure 4:
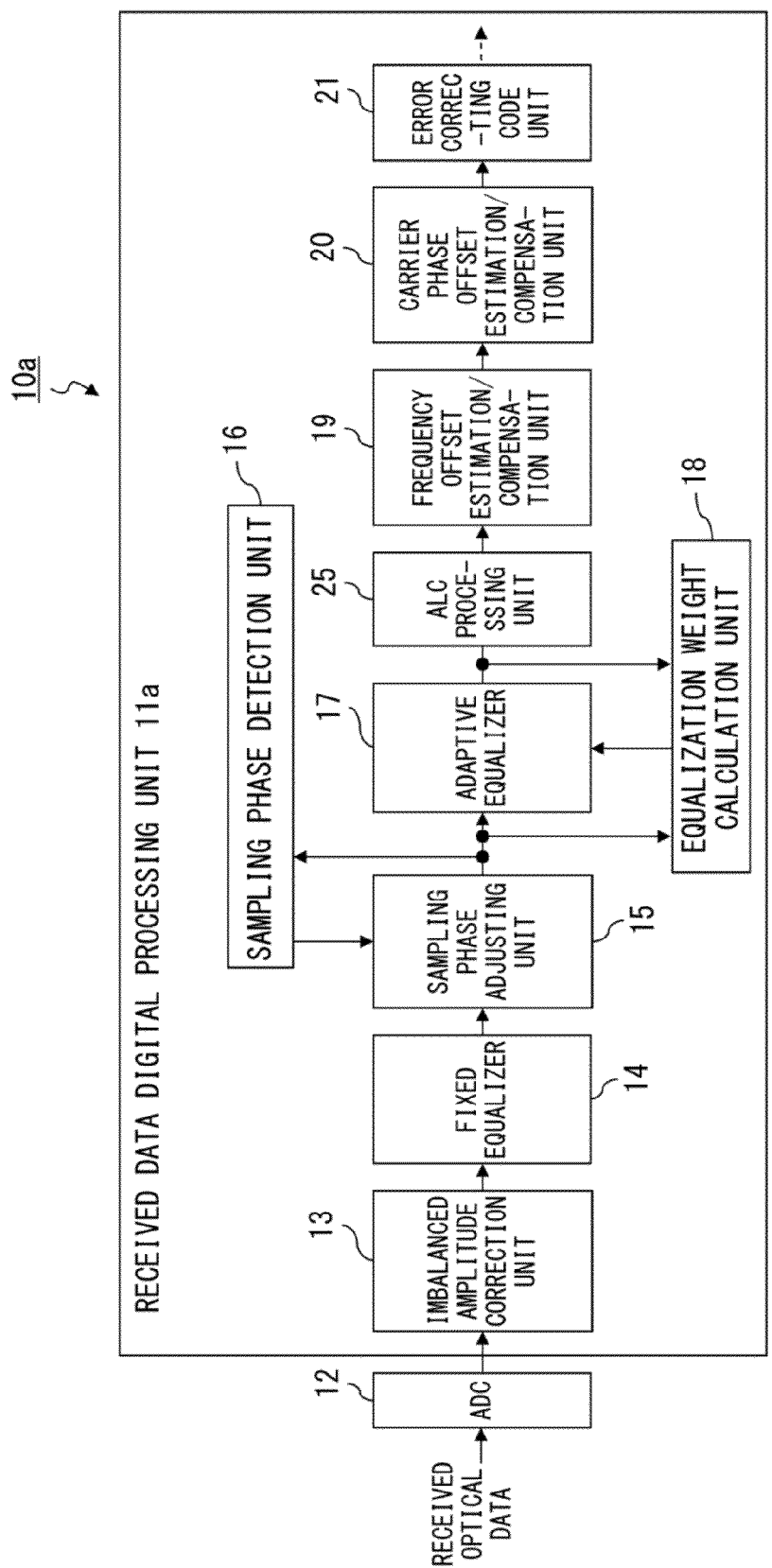
FIG. 4 is a block diagram showing a configuration of an optical digital coherent receiver according to the present embodiment.

FIG. 4 is a block diagram illustrating a configuration of an optical digital coherent receiver according to the present embodiment.

Figure 1:
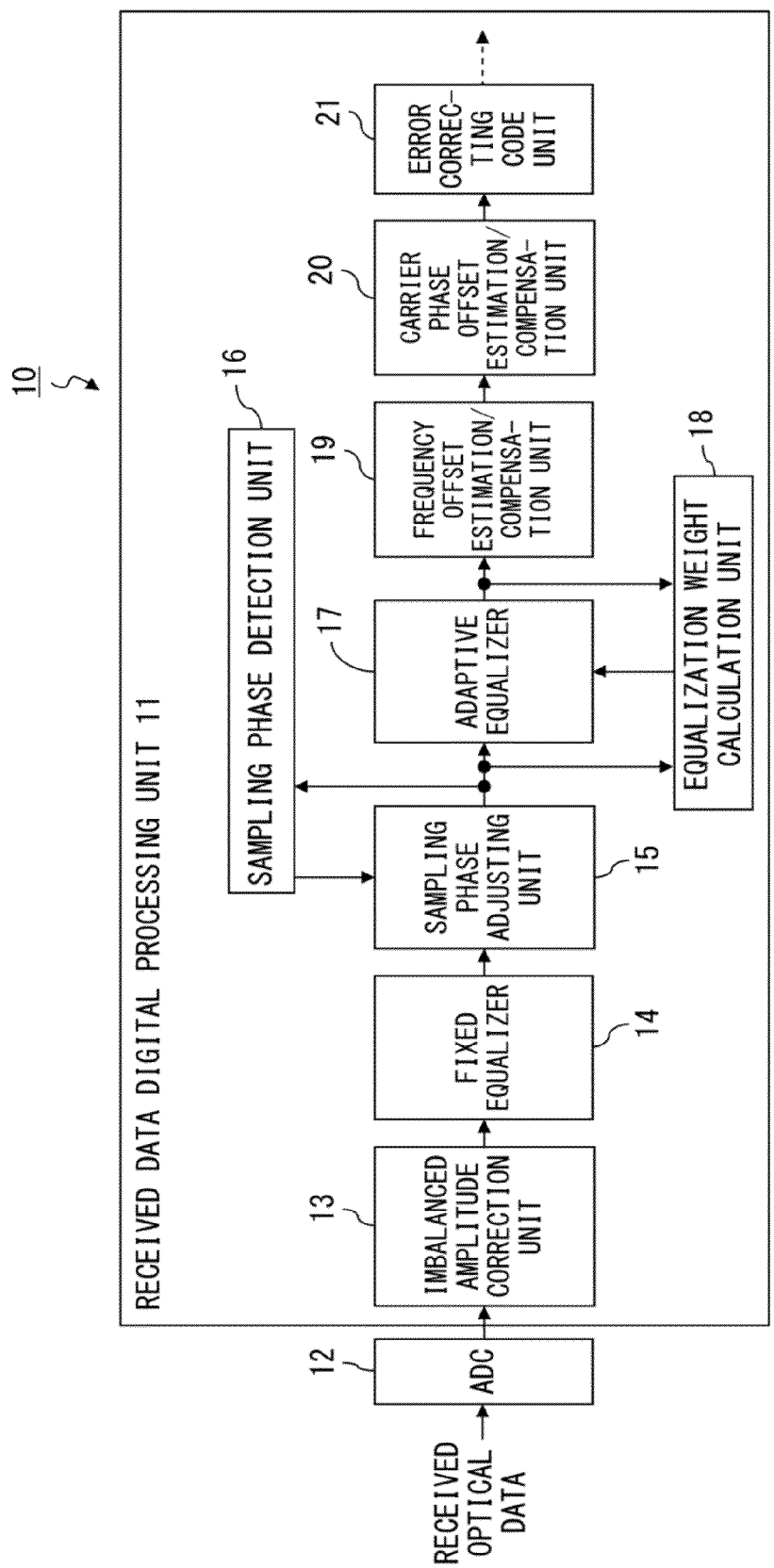
FIG. 1 illustrates an exemplary configuration of a conventional optical digital coherent receiver.
Figure 3B:
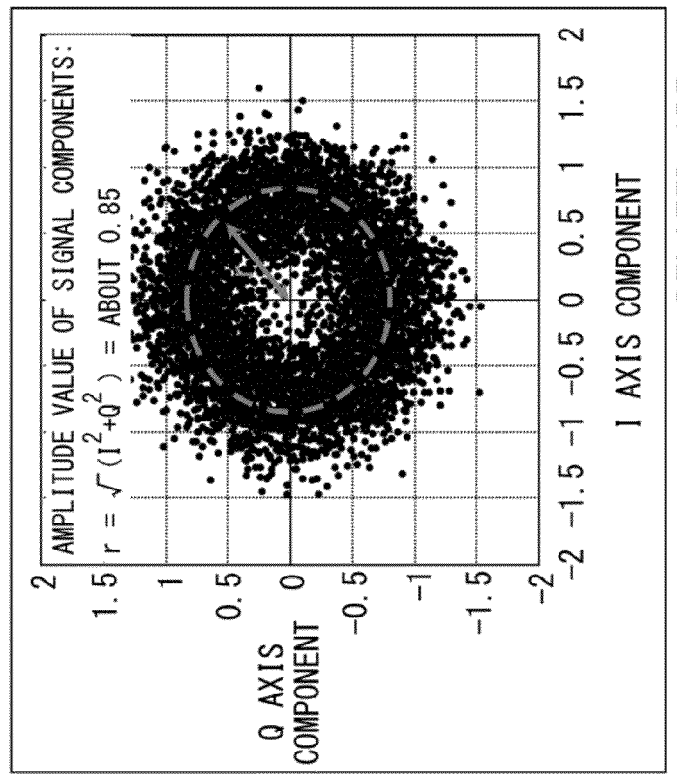
FIG. 3B illustrates problems in adaptive-equalizer outputs caused by differences in amounts of noise in adaptive equalizer inputs (part 2)
Figure 3A:
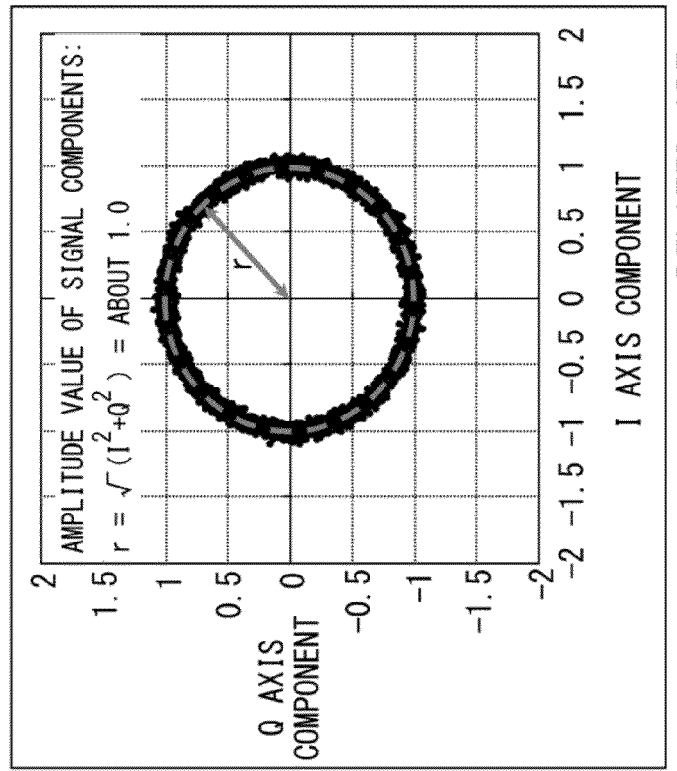
FIG. 3A illustrates problems in adaptive-equalizer outputs caused by differences in amounts of noise in adaptive equalizer inputs (part 1)

In FIG. 4, the same constituents as those in FIG. 1 are denoted by the same reference symbols, and the explanations thereof are omitted.

As illustrated in FIG. 4, the present embodiment includes an ALC (Automatic Level Control) processing unit 25 between the adaptive equalizer 17 and the frequency offset estimation/compensation unit 19. The ALC processing unit 25 performs, over a plurality of samples, detection of amplitude values of signals from the adaptive equalizer 17, and holds data indicating how many samples exist in which of the amplitude values. A histogram is generated using this data, and the amplitude value based on the largest number of samples is determined. Thereafter, the signal level (amplitude value) is corrected so that an amplitude value based on the largest number of samples is made to be the optimum level for the input of the error correcting code unit 21.

Also, as will be described later, the ALC processing unit 25 includes a level monitored value generation unit for adaptive-equalizer output signals, a histogram generation unit for monitored values, a level adjustment coefficient generation unit, and a level adjustment coefficient multiplication processing unit.

By setting a level setting value for a signal level adjustment by using table values or equations, the error correcting code unit is capable of adjusting signal levels to optimum signal levels in a short period of time.

Also, by controlling the degree of changing the level in signal level adjustments, it is possible to moderate an influence caused by abrupt level changes in stages later than the process by the ALC processing unit.

By making variable the total number of pieces of data used for generating the histogram of the monitored values, it is possible to adjust the signal level adjustment intervals and the reliability of monitored value determination.

Figure 5:
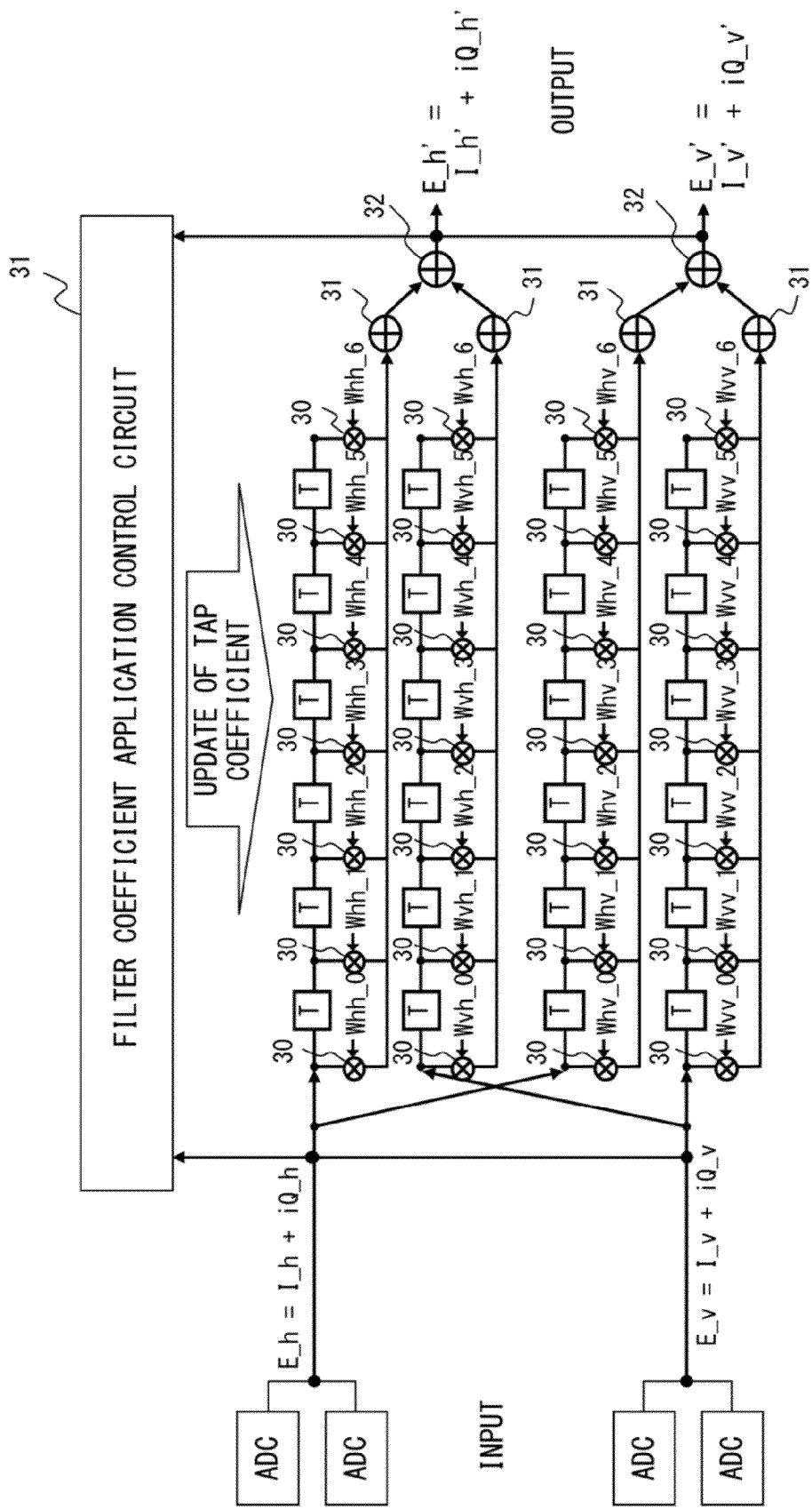
FIG. 5 illustrates a configuration of an adaptive equalizer (part 1)
Figure 6:
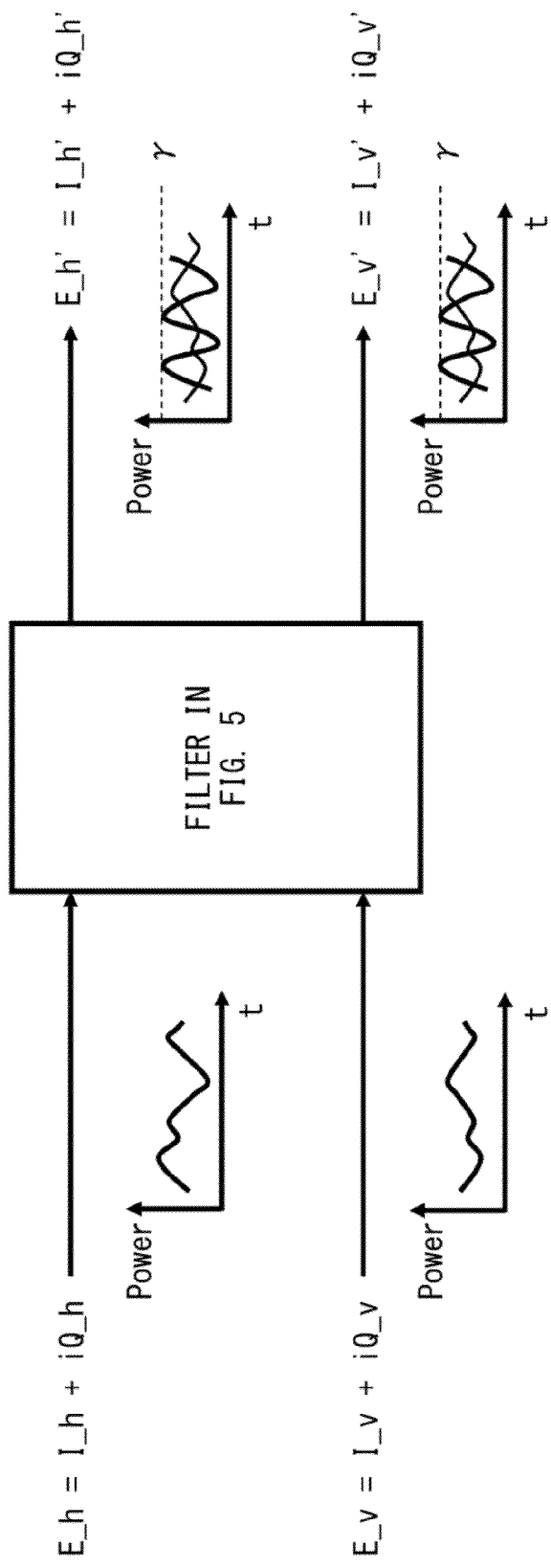
FIG. 6 illustrates a configuration of an adaptive equalizer (part 2)

FIGS. 5 and 6 illustrate a configuration of an adaptive equalizer.

The adaptive equalizer includes a digital filter. As illustrated in FIG. 5, the adaptive equalizer uses, as inputs, complex signals including I signals and Q signals obtained from their polarized signals. Input signals are input to a circuit in which delay devices (denoted by T) that delay signals by one sample are arrayed in series. Signals that have been delayed by one sample by the respective delay devices are output sequentially, and those output signals are multiplied by a tap coefficient (a filter coefficient) by a multiplier 30. A tap coefficient is controlled by a filter coefficient application control circuit 31. A signal that has been multiplied by the tap coefficient is added by the adder 31. Outputs from the adder 31 are further added by an adder 32, and the resultant value is output as an output from the adaptive equalizer. As outputs from the adaptive equalizer, E_h' and E_v', which are output signals with respect to two polarized beams orthogonal to each other, are obtained.

A tap coefficient is updated, for example, in accordance with the equation below.

$$w(n+1)=w(n)-\mu r^{*}(n)(|y_n|^2-\gamma)y_n$$

In the above equation, r(n) represents the received signal of the n-th sample, and is a complex signal. The symbol "*" in a superscript means that a complex conjugate is obtained. $Y_n$ represents the n-th output signal, and w(n) is the n-th tap coefficient. In other words, w(n) is the current tap coefficient to be multiplied by the currently received signal r(n), and w(n+1) represents a tap coefficient to be multiplied by a next received signal "r(n+1)". γ represents the target value of the electric power value of the output signal. In the process of updating a tap coefficient according to the above equation, the electric power value of an output signal gets closer to γ. The value of γ is 1, for example. μ is a parameter specifying the speed of updating tap coefficients. The higher μ is, the higher the updated value of a tap coefficient becomes, thus rapidly updating tap coefficients to new values, while when a tap coefficient is updated too rapidly, the tap coefficient varies a lot due to fluctuations in signals. In other words, because this is not favorable to operations of a filter, μ is made to be an appropriately small value so that tap coefficients change moderately. The value of μ is, for example, 0.02. The values of μ and γ are predetermined in the phase of designing the apparatus.

As illustrated in FIG. 6, E_h and E_v exist as input signals corresponding to two polarized beams of optical signals. The waveforms of such input signals are distorted due to polarized wave mixing, polarized wave mode dispersion, or wavelength dispersion. Because these input signals have already passed through the fixed equalizer, fixed waveform distortions in them have already been compensated for, and waveform distortion that has failed to be compensated for by the fixed equalizer remains. When these signals pass through the filter illustrated in FIG. 5, the waveforms are appropriately shaped when the tap coefficient becomes the optimum value, and the electric power values of output signals E_h' and E_v' become constant.

Figure 7:
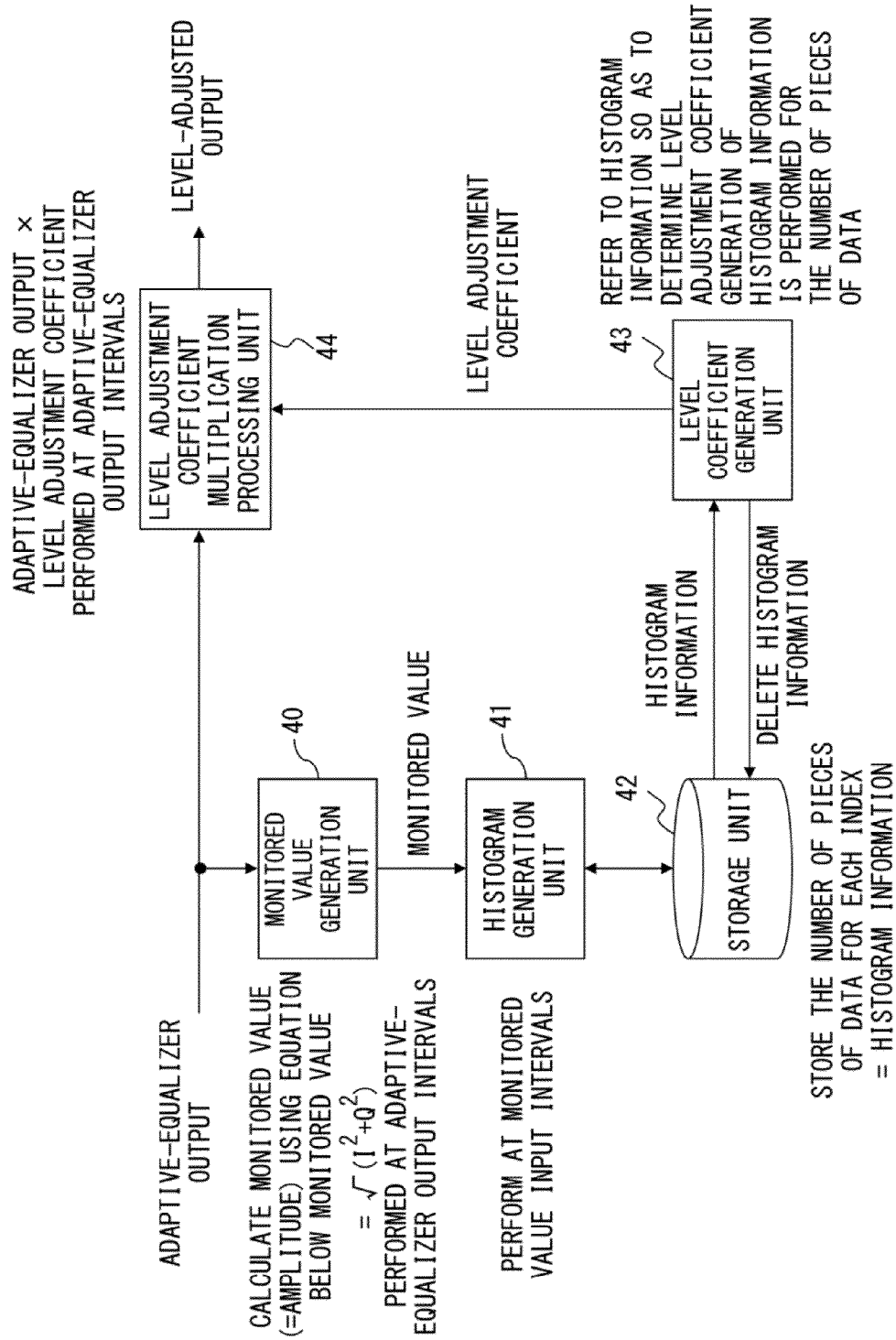
FIG. 7 is a block diagram showing a configuration of an ALC processing unit.

FIG. 7 is a block diagram illustrating a configuration of an ALC processing unit.

In a monitored value generation unit 40, a monitored value is generated by using signals output from the adaptive equalizer. As monitored values, an IQ data electric power value or an amplitude value of QPSK signals may be used. Hereinafter, an example using an amplitude value of IQ data is described.

A histogram generation unit 41 generates a histogram for the monitored value generated by the monitored value generation unit 40. The histogram is generated by counting the number of samples having a particular monitored value. Each time a signal is output from the adaptive equalizer, the monitored value generation unit 40 generates the monitored value of the signal, and inputs that monitored value to the histogram generation unit 41. Each time that monitored value is input, the histogram generation unit 41 increases the number of the samples and generates data of the number of samples for each monitored value. Each time the monitored value is input, the histogram generation unit 41 updates information of the histogram to store it to a storage unit 42. Actually, in a histogram, index values corresponding to monitored values are set, and the number of samples for each index value is stored.

The histogram that has been generated is stored in the storage unit 42 in such a manner that a level adjustment coefficient generation unit 43 is allowed to refer to the histogram stored in the storage unit 42. The level adjustment coefficient generation unit 43 determines the monitored value (monitored values are read from index values) based on the largest number of samples (the number of pieces of data), and generates a level adjustment coefficient. The level adjustment coefficient generation unit 43 determines the peak value of the generated histogram (the monitored value based on the largest number of samples) to be the signal level (amplitude value) of the signal components of the received signal, and generates a level adjustment coefficient in such a manner that the signal level of the signal components is the target value. The reason for determining the peak value of a histogram to be the signal level of signal components is as follows. Noise components are generated randomly, making the amplitudes and occurrence frequency of noise components inconsistent, and accordingly it is thought that the likelihood that many noise components will occur in one amplitude is low. By contrast, the amplitudes of signal components are predetermined, and generated regularly, and thus signal components are thought to respond to amplitudes that occur the most frequently among signals including noise components.

A level adjustment coefficient generation unit 43 reads information of a histogram from the storage unit 42, and determines a level adjustment coefficient. Thereafter, the level adjustment coefficient generation unit 43 instructs the storage unit 42 to delete the information of the histogram. The level adjustment coefficient is transferred to a level adjustment coefficient multiplication processing unit 44. The level adjustment coefficient multiplication processing unit 44 multiplies the output from the adaptive equalizer by the level adjustment coefficient so as to obtain a level-adjusted output. Multiplexing of a level adjustment coefficient is performed each time a level adjustment coefficient is output from the level adjustment coefficient generation unit 43. The target (amplitude) value in the level adjustment coefficient generation unit 43 is an appropriate signal level (an amplitude value including a fixed value) used when an error correction process, which will be performed in a later stage, is performed.

Figure 8:
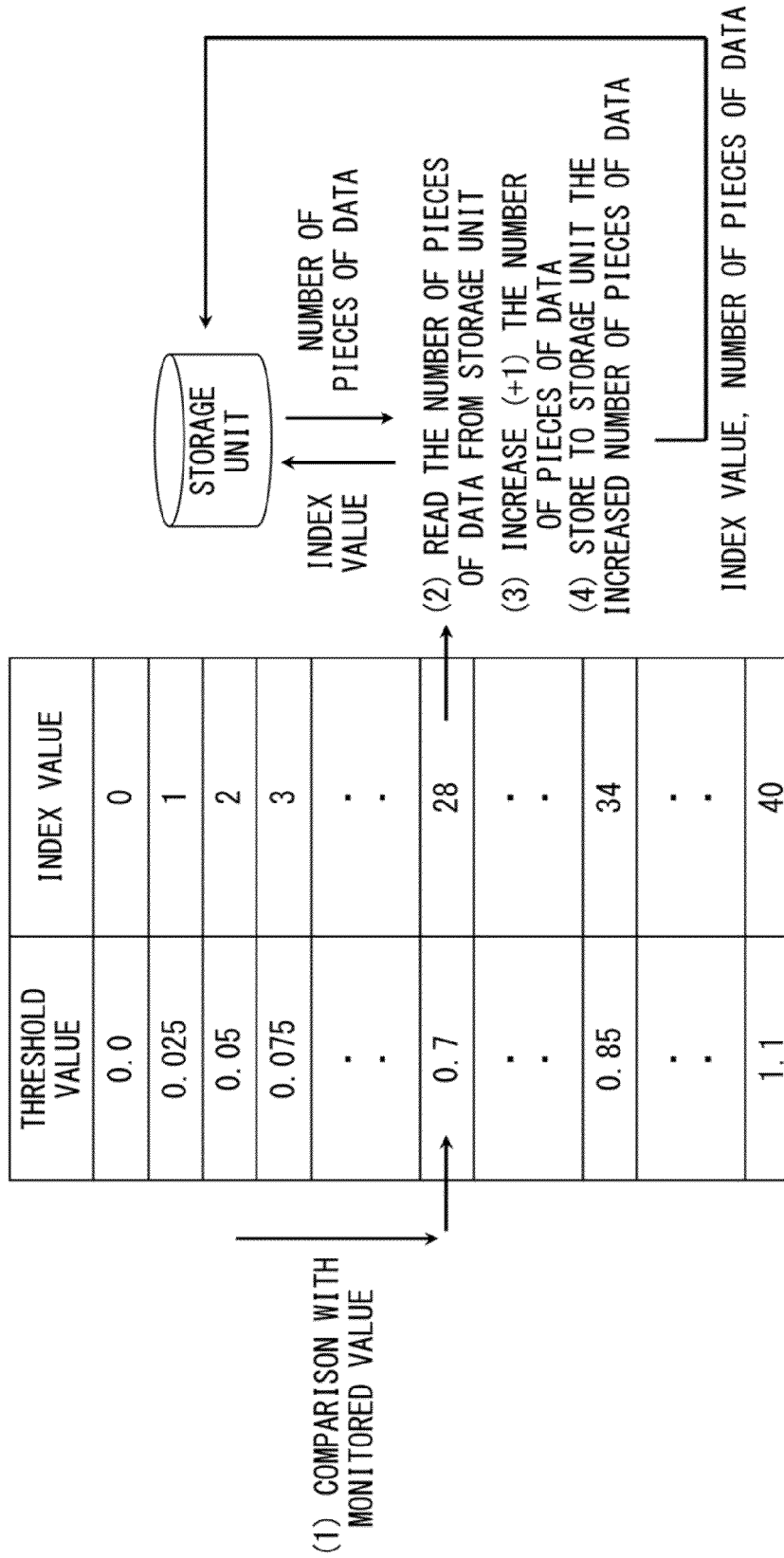
FIG. 8 explains a method of generating a histogram.

FIG. 8 explains a method of generating a histogram.

When a monitored value is input, the histogram generation unit 41 refers to a table storing index values and threshold values for classifying monitored values into discrete classes in such a manner that they correspond to each other, and obtains the index values corresponding to the monitored value that has currently been input (1). Next, the number of pieces of data (the number of samples) that corresponds to the obtained index value is read from the data of the histogram stored in the storage unit (2). Thereafter, the number of samples is incremented by one (3), and the data of the histogram (the number of pieces of data) stored in the storage unit is updated (4). Thereby, each time a monitored value is input, the shape of the histogram is changed.

FIG. 9 is a flowchart illustrating a process performed by the ALC processing unit.

When a signal output from the adaptive equalizer is obtained in step S10, a monitored value is generated from the output signal in step S13. In step S14, a histogram is generated from the monitored value (the number of pieces of data is incremented), and a total-number-of-pieces-of-data determination is performed in step s15. The total-number-of-pieces-of-data determination is a determination of whether the total number of pieces of data that constitutes the final state of the histogram and that is stored in the storage unit has reached the prescribed total number of pieces of data. When the result of the determination in step S15 is No (i.e., the total number has not reached the prescribed value), the process returns to step s13, and the generation of the histogram is continued. When the result of the determination in step S15 is Yes (i.e., the total number has reached the prescribed value), a level adjustment coefficient is generated in step S16. The level adjustment coefficient generated in step 16 is transferred to the level adjustment coefficient multiplication process in step S11 so as to be used for updating a level adjustment coefficient that is multiplied by a signal output from the adaptive equalizer. By the level adjustment coefficient multiplication process performed in step S11, the signal is output after the level adjustment is obtained in step s12. Also, when a level adjustment coefficient is generated in step s16, the information of the histogram is deleted in step s17, and the process returns to step S13 so that the generation of a new histogram is started.

Figure 10:
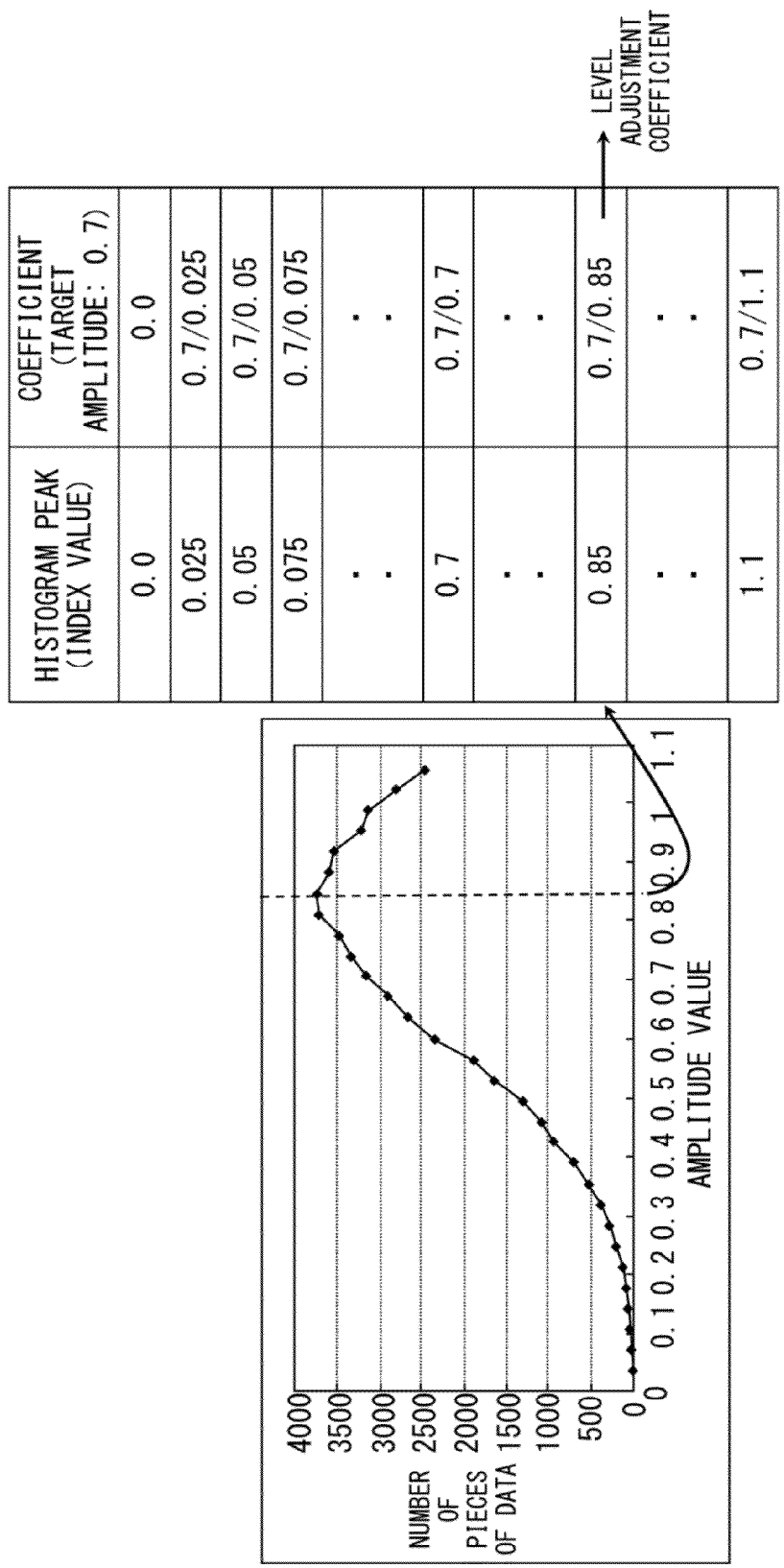
FIG. 10 illustrates an example of a method of generating a level adjustment coefficient in the level adjustment coefficient generation unit.

FIG. 10 illustrates an example of a method of generating a level adjustment coefficient in the level adjustment coefficient generation unit.

In this explanation, the method of generating a level adjustment coefficient illustrated in FIG. 10 is referred to as generation method 1. In generation method 1, a value to correct a difference between the peak value of a histogram (the monitored value based on the largest number of samples) (index value)) and the target amplitude value is employed as a level adjustment coefficient. As a method of determining a value of a level adjustment coefficient, there are several methods including a method in which a table is referred to using the histogram peak value as an input value, and a method in which equations are used for calculating the value.

FIG. 10 explains a method of referring to the table. The level adjustment coefficient generation unit includes a table to store index values of a histogram and a level adjustment coefficient in a state in which they correspond to each other so that the peak value of a histogram can be retrieved. The level adjustment coefficient generation unit detects the index value based on the largest number of pieces of data from the information of the histogram. Index values are values that correspond to monitored values in a one-to-one manner. In FIG. 10, index values are described as values corresponding to monitored values. When the index value of the peak value is known, the table is referred to by using this value, and the level adjustment coefficient is obtained.

As an alternative method, it is also possible to calculate the value by using an equation such as (target amplitude value)/

(index value). In the example illustrated in FIG. 10, values of (target amplitude value)/(index value) are registered as level adjustment coefficients so that they can be referred to. In addition, the target amplitude value is assumed to be 0.7 in this example. As has been described, the table portion is expressed in the form of equations when the value is calculated using equations. The present generation method is used when the first level adjustment coefficient is generated, when the histogram is highly reliable (when there are a large number of pieces of data used for the generation of the histogram), or when it is desired that the level coefficient immediately follow changes in the level of the signal. A table and an equation are predetermined in advance when the level adjustment coefficient generation unit is designed respectively for when a table is to be used and when an equation is to be used.

FIGS. 11A and 11B illustrate examples of histograms.

FIGS. 11A and 11B illustrate histograms generated as the numbers of pieces of corresponding data for the cases when the OSNR is 100 dB and when the OSNR is 12 dB, respectively. The horizontal axes represent index values corresponding to monitored values (amplitude values) and the vertical axes represent monitored values.

FIG. 11A illustrates an example of a histogram of an adaptive-equalizer output when the OSNR is 100 dB. Because there are not many noise components, the magnitude of the signal amplitudes are not disturbed, and the signal levels are collected around the index value of about 1. FIG. 11B illustrates signal levels when the OSNR is 12 dB and there are many noise components. Because noise components of various amplitudes are included in signal components, the amplitude values of signal components in adaptive-equalizer output spread out. Also, because the adaptive equalizer attempts to make output amplitudes including noise components constant, the signal components are influenced greatly by noise components, and thus the position of the peak of the distribution of the amplitude values of the signal components on the histogram can be as small as about 0.85.

FIGS. 12A, 12B, 13A, and 13B illustrate operations according to the present embodiment.

When the target value of the amplitude is set to 0.7 for the histograms illustrated in FIGS. 11A and 11B, level adjustment coefficients that compensate for the difference between the peak and the target value as illustrated in the histograms of FIGS. 12A and 12B are generated. FIG. 12A illustrates the case when the OSNR is 100 dB, and FIG. 12B illustrates the case when the OSNR is 12 dB. In the present example, the target amplitude value has been set to 0.7. Accordingly, the level adjustment coefficient is generated so that the peak value is changed from 1.0 to 0.7 in the case of FIG. 12A and the peak value is changed from 0.85 to 0.7 in the case of FIG. 12B. The optimum value as an input to the error correcting code unit is the target value, and that value is currently 0.7, and accordingly a level adjustment is required both in the case of 12A and in the case of 12B. Alternatively, when the optimum value for the error correcting code unit is set to 1.0, a level adjustment is not required in the case of FIG. 12A, and a level adjustment is required only in the case of FIG. 12B.

According to the present embodiment, regardless of the value the target value is set to, the signal level from the adaptive equalizer is made, by the ALC processing unit, to be at the optimum level for the error correcting code unit, and accordingly more flexible responses to changes can be made.

FIGS. 13A and 13B illustrate the distribution of signal levels after a level adjustment (level-adjusted outputs).

FIG. 13A illustrates the case when the OSNR is 100 dB, and FIG. 13B illustrates the case when the OSNR is 12 dB. In both cases, adjustments have been conducted so that the peak value of the signal level distribution is 0.7, which is the target value. As has been described, it is thought that mainly signal components correspond to the peak value of the signal level distribution, and accordingly the signal components can be considered as having been adjusted to the optimum level for the error correcting code unit.

FIGS. 14A and 14B illustrate results obtained by applying the present embodiment to signals illustrated in FIG. 2.

FIG. 14A illustrates the case when the OSNR is 100 dB, and FIG. 14B illustrates the case when the OSNR is 12 dB. Although the signal amplitudes r are not spread in FIG. 14A because there are fewer noise components than in the case of FIG. 14B, the amplitudes of the peak values of signal levels have been adjusted to about 0.7 in both cases. Note that in FIG. 14, amplitude value r is expressed by $r=\sqrt{(I^2 + Q^2)}$ where I represents the amplitude of an I signal, and Q represents the amplitude of a Q signal.

FIG. 15 illustrates another example of a method of generating a level adjustment coefficient performed by the level adjustment coefficient generation unit.

In this explanation, the method of generating a level adjustment coefficient illustrated in FIG. 15 is referred to as generation method 2. In generation method 2, a level adjustment coefficient obtained by generation method 1 is reflected, at an arbitrary ratio, on the level adjustment coefficient that is being used currently, and the resultant value is used as the new level adjustment coefficient. As a method of determining a level adjustment coefficient, generation method 1 is used, and a level adjustment coefficient to compensate for the difference between the peak value on the histogram and the target value is determined as an interim value. A subtractor 50 is used for calculating the difference (Δ) between this interim value and the currently-used level adjustment coefficient, and the calculated difference is multiplied by an arbitrary ratio (coefficient) by a multiplier 51, and the resultant value is added to the currently-used level adjustment coefficient by the adder 52 (updated), and the resultant value is used as a new level adjustment coefficient. The present generation method is used when the reliability of the histogram is low (the total number of pieces of data used for generating the histogram is small) or when it is desired that the level adjustment coefficient follow the level variations in signals slowly.

Examples of the values calculated in FIG. 15 are illustrated below.

Example 1

Level adjustment coefficient (currently-used value): 0.7
Level adjustment coefficient (interim value): 0.8
Arbitrary ratio: 0.5
Δ (level adjustment coefficient)=0.8−0.7=0.1
Level adjustment coefficient (updated value)=0.7+0.1× 0.5=0.75

Example 2

Level adjustment coefficient (currently-used value): 0.8
Level adjustment coefficient (interim value): 0.7
Arbitrary ratio: 0.5
Δ (level adjustment coefficient)=0.7−0.8=−0.1
Level adjustment coefficient (updated value)=0.8+(−0.1)× 0.5=0.75

Figure 16:
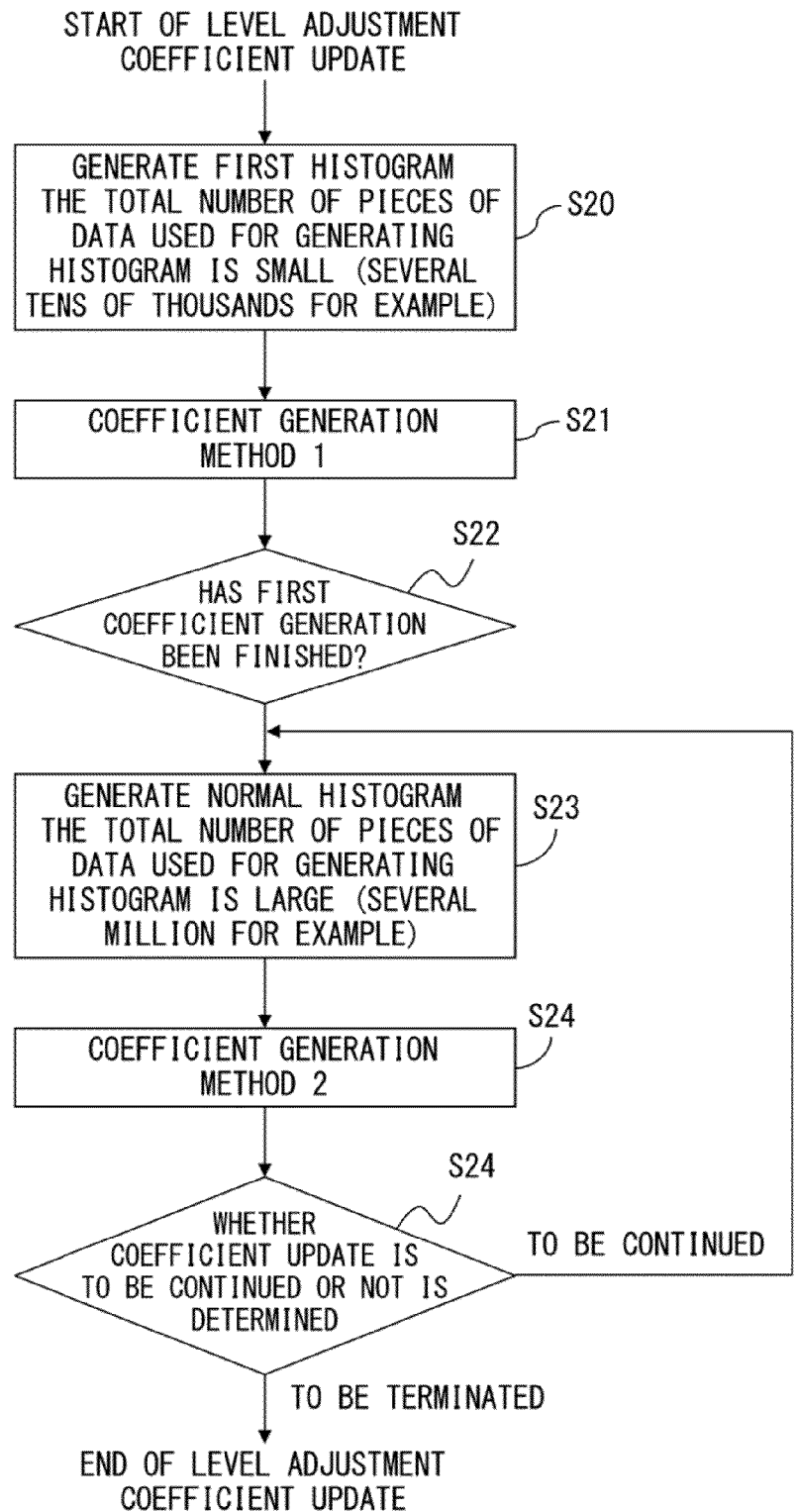
FIG. 16 illustrates a flowchart explaining a process of generating a level adjustment coefficient.

FIG. 16 illustrates a flowchart explaining a process of generating a level adjustment coefficient.

Generation methods 1 and 2 above may be used solely or in combination. In the flowchart illustrated in FIG. 16, the process when generation methods 1 and 2 are used in combination is adopted.

When the level adjustment coefficient updating process starts in the flowchart illustrated in FIG. 16, a first histogram is generated in step s20. When a level adjustment coefficient has not been performed previously, a first histogram is generated using a small total number of pieces of data. "A small total number of pieces of data" is, for example, several tens of thousands. The reason for this small number is that in the first generation, a level adjustment coefficient is generated rapidly so that the process can rapidly return to the normal processes. In step s21, the first level adjustment coefficient is generated using generation method 1. The reason for using generation method 1 is that there is not a coefficient that has previously been generated as the first generation. In step s22, the process waits for the first generation to be completed.

In step S23, normal histograms are generated for the second or subsequent times. In this case, a larger number of pieces of data than are used for generating the first histogram are used. The total number of pieces of data used for generating a histogram is, for example, several million. In a normal process, a larger number of pieces of data are used for generating a histogram in order to increase the reliability in the detection of the peak value of a histogram, and to increase the accuracy of the level adjustment coefficient. In step S24, a level adjustment coefficient is generated using generation method 2. This is performed in order to make changes in the level adjustment coefficient slowly follow changes in signal levels. If a level adjustment coefficient is made to rapidly follow changes in signal levels, the operation may be influenced by the noise components, and accordingly, generation method 2 is used in a normal process. In the coefficient update continuation determination in step s24, it is determined whether the coefficient generation is to be continued or not in accordance with the period of time that has elapsed from the start of the level adjustment and an instruction received from a host system. When it is determined in step s24 that the generation is to be continued, the process returns to step S23, and the updating of the coefficient is continued. When it is determined that the generation is to be terminated, the process is terminated.

As has been described, the total number of pieces of data of monitored values used for generating histograms changes, and the intervals for adjusting signal levels and the reliability in the monitored value determination are adjusted.

The level adjustment coefficient multiplication processing unit multiplies the generated level adjustment coefficient by the adaptive-equalizer output signal in order to generate a level-adjusted output.

As has been described in detail, the present embodiments enable level adjustments of adaptive-equalizer output signals optimally in an optical digital coherent receiver.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. An optical digital coherent receiver that performs optical coherent reception and detection of a received optical signal, and that demodulates the received signal by a digital signal process, comprising:

an adaptive equalizer to compensate for waveform distortion of the received signal, and to output a resultant signal; and a signal level adjustment unit to repeat operations of sampling an amplitude of a signal output from the adaptive equalizer so as to determine sampled amplitude values as discrete values, and to generate a level adjustment coefficient to be multiplied by the output signal, from a histogram registering the sampled amplitude values by determining the largest number of samples and from a target value from among a plurality of sampling operations, and to perform a signal level adjustment by multiplying the output signal by the level adjustment coefficient.

2. The optical digital coherent receiver according to claim 1, wherein:

the sampled amplitude values are obtained by using the signal output from the adaptive equalizer before the signal level adjustment.

3. The optical digital coherent receiver according to claim 1, wherein:

the target value corresponds to an optimum value of an input to an error correcting code unit provided in a stage later than the signal level adjustment unit.

4. The optical digital coherent receiver according to claim 1, wherein:

the total number of a plurality of samples are different between when the level adjustment coefficient is generated for a first time and when the level adjustment coefficient is generated for a second and subsequent times.

5. The optical digital coherent receiver according to claim 1, wherein:

the signal level adjustment unit comprises a histogram that stores differences between a sampled amplitude value at which the largest number of the samples is obtained and the target value in such a manner that the differences correspond to the level adjustment coefficients; and the signal level adjustment unit refers to the histogram so as to determine the level adjustment coefficient.

6. The optical digital coherent receiver according to claim 1, wherein:

the signal level adjustment unit stores an equation to calculate the level adjustment coefficient from the difference between an amplitude value at which the largest number of the samples is obtained and the target value; and the signal level adjustment unit uses the equation to determine the level adjustment coefficient.

7. The optical digital coherent receiver according to claim 6, wherein:

the equation is expressed as (level adjustment coefficient) =(target value)/(a sampled amplitude value at which the largest number of samples is obtained).

8. The optical digital coherent receiver according to claim 1, wherein:

an updated level adjustment coefficient is determined by reflecting, on the level adjustment coefficient that is used currently, a prescribed ratio of the level adjustment coefficient determined by the multiplication.

9. The optical digital coherent receiver according to claim 1, wherein:

when the level adjustment coefficient is determined for a first time, a signal level adjustment is performed by using the determined level adjustment coefficient, and in second and subsequent determinations of level adjustment coefficient, an updated level adjustment coefficient is determined by reflecting, on the level adjustment coefficient that is used currently, a prescribed ratio of the level adjustment coefficient that was initially determined.

10. A processing method for an optical digital coherent receiver that performs optical coherent reception and detection of a received optical signal, and demodulates the received signal by a digital signal process, comprising:
   compensating for waveform distortion of the received signal so as to output a resultant signal;
   repeating operations of sampling an amplitude value of a signal output from the adaptive equalizer so as to determine sampled amplitude values as discrete values;
   generating a level adjustment coefficient to be multiplied by the output signal from a histogram registering the sampled amplitude values by determining the largest number of samples and from a target value from among a plurality of sampling operations; and
   performing a signal level adjustment by multiplying the output signal by the level adjustment coefficient.

* * * * *